(12) United States Patent
De Pasquale et al.

(10) Patent No.: US 8,254,950 B2
(45) Date of Patent: Aug. 28, 2012

(54) METHOD AND NETWORK CONTROLLER FOR SWITCHING BETWEEN NETWORK SHARING ARCHITECTURES

(75) Inventors: Andrea De Pasquale, Madrid (ES); Francisco Javier Dominguez Romero, Madrid (ES)

(73) Assignee: Vodaphone Group PLC, Newbury, Berkshire (GB)

( * ) Notice: Subject to any disclaimer, the term of this patent is extended or adjusted under 35 U.S.C. 154(b) by 178 days.

(21) Appl. No.: 12/701,459

(22) Filed: Feb. 5, 2010

(65) Prior Publication Data
US 2010/0227623 A1 Sep. 9, 2010

(30) Foreign Application Priority Data

Feb. 5, 2009 (ES) .................................. 200900328

(51) Int. Cl.
*H04W 72/00* (2009.01)
(52) U.S. Cl. ...................... 455/453; 455/432.1; 455/436; 455/439; 455/450; 455/452.2; 370/328; 370/329; 370/331; 370/332; 370/333
(58) Field of Classification Search .......................... None
See application file for complete search history.

(56) References Cited

U.S. PATENT DOCUMENTS

| | | | | |
|---|---|---|---|---|
| 2003/0013443 A1* | 1/2003 | Willars et al. | ................. | 455/432 |
| 2004/0162077 A1* | 8/2004 | Kauranen et al. | ............. | 455/445 |
| 2005/0213566 A1* | 9/2005 | Jutila et al. | ..................... | 370/352 |
| 2006/0073831 A1* | 4/2006 | Guyot et al. | .................. | 455/443 |
| 2006/0094434 A1* | 5/2006 | Peltola et al. | ................. | 455/450 |
| 2008/0112353 A1* | 5/2008 | Ljung et al. | ..................... | 370/315 |
| 2008/0293419 A1* | 11/2008 | Somasundaram et al. | .... | 455/437 |
| 2008/0316980 A1* | 12/2008 | Ahlen et al. | .................. | 370/338 |
| 2011/0009145 A1* | 1/2011 | Pirinen | ......................... | 455/509 |

FOREIGN PATENT DOCUMENTS

WO    WO 2006103093 A2 * 10/2006

OTHER PUBLICATIONS

Zhou Lin "The art of RAN-sharing," "China Mobile the accelerating elephant", Huawei Technologies Communicate, Issue 35, pp. 50-52, Oct. 2007.

* cited by examiner

Primary Examiner — Dai A Phuong
(74) Attorney, Agent, or Firm — Workman Nydegger

(57) ABSTRACT

In RAN sharing scenarios wherein radio spectrum allocated to multiple mobile network operators is split into at least one carrier, the steps for switching the configurations of carriers for RAN sharing are proposed here, defining:
  a pooled configuration by which all the operators share at least one carrier; and
  a dedicated configuration by which each operator has at least one carrier assigned for allocation of its traffic.
The start point for switching is single carrier in the pooled configuration. Traffic load in the shared single carrier is constantly measured to compare it with a threshold, so that, when the measured load exceeds the threshold and if spectrum pre-emption is possible to create additional carriers, the switching from the single carrier in the pooled configuration to the plurality of carriers is performed, selecting the configuration for each carrier from three possible options: pooled, dedicated or a combination of both.

13 Claims, 2 Drawing Sheets

METHOD AND NETWORK CONTROLLER FOR SWITCHING BETWEEN NETWORK SHARING ARCHITECTURES

CROSS-REFERENCES AND RELATED APPLICATIONS

This application claims the benefit of Spanish Patent Application No. ES 200900328, filed Feb. 5, 2009, entitled "Method and Network Controller for Switching between Network Sharing Architectures," which is incorporated herein by reference in its entirety.

FIELD OF THE INVENTION

Embodiments of the present invention relate to the telecommunications sector and, especially, in the industrial area engaged in providing Radio Access Networks (RANs) with elements of cellular infrastructures such as Radio Network Controllers (RNCs) for wireless communications systems supporting 3G or beyond 3G technologies (i.e., WCDMA, HSDPA, LTE, WiMax, etc.).

More particularly, embodiments of the invention described herein relate to methods and RNCs for dynamically switching between two different network architectures or configurations in order to allow an efficient RAN sharing among a plurality of mobile network operators optimally, on a traffic-load basis.

BACKGROUND

Network sharing is a way for operators to share the heavy deployment costs for mobile networks (PLMNs), especially in the roll-out phase. A network sharing architecture allows different core network operators to connect to a shared radio access network (RAN), wherein the operators do not only share the radio network elements, but may also share the radio resources themselves. In addition to this shared RAN, the operators may or may not have additional dedicated RANs, like for example, 2G radio access networks.

In the current economical situation, the RAN sharing features are becoming more and more important in order to share the CAPEX and OPEX costs of 3G roll-out. The existing network sharing architectures allow to share the capital cost of the equipments (typically RNCs, NodeBs, Antennas, SW licenses) as well as the operational cost of the network (Energy consumption, maintenance costs, Iub transmission costs if the transmission is shared).

There are two identified main techniques or configurations for RAN sharing architecture which are used today in the 3G networks (see, for instance, "The art of RAN-sharing" by Zhou Lin, "China Mobile the accelerating elephant", Huawei technologies COMMUNICATE, Issue 35, p.p., 50-52, October 2007):

The Multiple Operator Core Network (MOCN) which is a feature standardized by the 3GPP (3GPP TS 23.251 "Network Sharing; Architecture and functional description; Release 6"). MOCN is a pooled spectrum approach which allows multiple operators to share the spectrum, i.e. to run a network using a single 5 MHz carrier, which can be useful in situation when the spectrum is a scarce resource. The drawback of this configuration is that special effort (SIMs, special signalling) has to be used in order to guarantee that the user terminals can display the correct operator code or Public Land Mobile Network-Identifier (PLMN-Id). Besides, RAN sharing by a MOCN requires the plurality of operators for an agreement on a common set of parameters and feature activation, since the radio resources (UMTS cells) are common for all the operators (there is a single shared carrier=1 sector). In the MOCN configuration, multiple Core Network (CN) nodes are connected to the same RNC and the CN nodes are operated by the different operators.

The RAN Sharing with Dedicated Carrier (RS-DC) is a dedicated spectrum approach, not standardized currently, which uses a Dedicated Carrier (sector of cells) per operator. Every operator handles its own spectrum (i.e., its own UMTS cells) and as a consequence each operator can choose its appropriate set of parameters, with the aim to create a consistent user experience across the whole network (made of multiple separated areas where the sharing is not applied and areas where the sharing is applied).

Hence, when the spectrum is a scarce resource (e.g. in UMTS900), usage of MOON is preferred. However, when traffic grows, there is a need to increase the number of carriers and RAN Sharing with Dedicated Carrier is preferred.

Particularly, in the network scenario of UMTS900 services, the 900 MHz Spectrum is mainly used by speech services and UMTS technology can be activated in order to increase the system capacity for speech in CS (circuit switching) domain or in order to offer new PS (packet switching) services. A single UMTS Carrier can be created using the 900 MHz spectrum for a plurality of operators in the MOON architecture for RAN sharing. But, if one carrier is loaded, and many CS speech calls are rejected in UMTS or redirected to 2G RANs due to the load, this indicates that a sufficient amount of user terminals are asking for a second carrier.

In addition, the usage of MOON is preferred when the energy cost (OPEX) of radiating one carrier is preferred over radiating two carriers with the RAN Sharing Dedicated Carrier Technique.

Therefore, an automatic technique for switching between both features (the pooled spectrum approach and the dedicated spectrum approach) is needed nowadays to make the change of network configuration easy and dynamical, since a manual switch to configure separately and activate one or another is a difficult task.

SUMMARY

Embodiments of the present invention serve to solve the aforesaid problem by providing a radio network controller (RNC) with a method for switching between RAN sharing configurations/architectures automatically and dynamically, taking into account the traffic load over time due to each mobile network operator sharing the radio access network (RAN).

Traffic load is measured in both uplink (UL) and downlink (DL) constantly for every carrier which radio spectrum is currently split into and these measurements can trigger the switching between RAN sharing with one (or more) pooled carrier(s) in MOON configuration and RAN Sharing with at least one dedicated carrier (in a dedicated configuration or in a combination of both MOON and RS-DC).

In addition, the application of such method to the 900 MHZ spectrum allows the introduction of UMTS services together with RAN Sharing based on the amount of traffic in both the 2G (speech) and the 3G system.

In this context, a carrier is one UMTS channel of 5 MHz used in a cell.

One embodiment refers to a method for switching between network architectures using two possible configurations of carriers for RAN sharing: pooled configuration (MOON) and dedicated configuration (RS-DC). In the pooled configuration, all the mobile network operators share at least one carrier of the radio spectrum. In the dedicated configuration, each mobile network operator has at least one carrier assigned from the carriers which radio spectrum is split into. The method comprises the steps of:

allocating a single carrier to traffic of all the mobile network operators, which share the single carrier in the pooled configuration;

measuring an indicator of traffic load in the shared single carrier, comparing the measured traffic load of the single carrier with a threshold and only when the measured load exceeds the threshold, checking availability of pre-empting radio spectrum to split it into a plurality of carriers and if said pre-emption is available, switching from the single carrier in the pooled configuration to the plurality of carriers into which radio spectrum is split for allocating traffic of the mobile network operators.

Multiple carriers can be shared by all the mobile network operators in the pooled configuration. Another option is choosing from the plurality of carriers at least one carrier which is shared by all the mobile network operators in the pooled configuration and at least another which is assigned to a respective mobile network operator in the dedicated configuration. Also, in the dedicated configuration, an implementation option is that every carrier is dedicated, assigned to a respective mobile network operator.

Additionally, the method further comprises measuring an indicator of traffic load in the plurality of carriers. Only when the measured load of all the carriers can be allocated to one single carrier, the method returns to the pooled configuration with a single carrier in the spectrum.

Another embodiment deals with a radio network controller (RNC) comprising processing means for performing the method described before.

Yet another embodiment is directed to a computer program comprising program code means which execute the method described before, when loaded into processing means of the radio network controller defined above.

One advantage of disclosed embodiments is that when one carrier is not enough to handle the traffic of the sharing operators, the system automatically switch to the Dedicated Configuration allowing each operator to gain in spectrum usage optimization and network consistency.

A further advantage is in the roll-out of the UMTS900 services, because this invention allows minimum spectrum consumption in the phases wherein the amount of UMTS900 capable terminals in the network is low and a limited amount of 900 MHz bandwidth can be made available.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF EXAMPLE EMBODIMENTS

Figure 1:
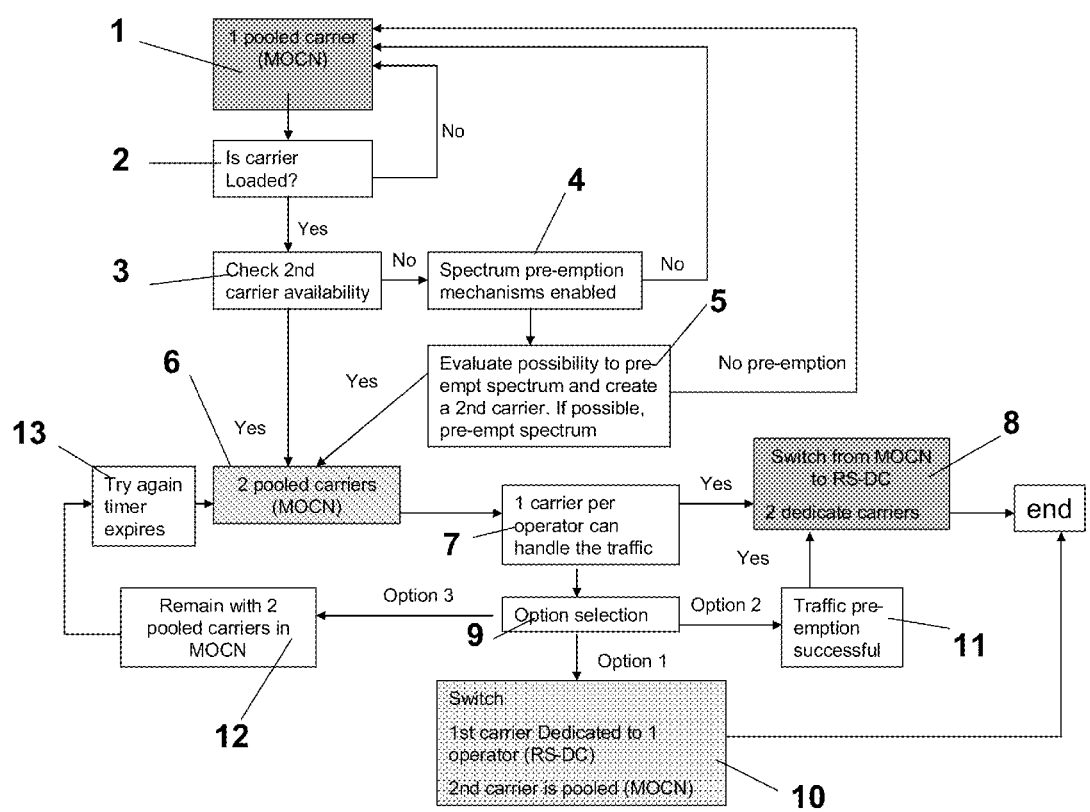
FIG. 1.—It shows a block diagram of the method for switching between network configurations in a shared radio access network which can support two carriers, in accordance to a preferred embodiment of the invention. The figure shows the process from 1 MOON carrier till the activation of $2^{nd}$ carrier with different possibilities.

FIG. 1 illustrates the steps of a dynamic switch method implemented by a RNC for RAN sharing in a simple network scenario wherein two operators share the RAN under certain parameters set by a RAN-sharing agreement. For simplicity, the RNC starts from a scenario with a pooled configuration in which RAN Sharing MOON is active and a single carrier is used (1).

The load of the single carrier is constantly measured or monitored (2) in both UL and DL. Traffic load is a function of the measurements over time on DL transmission power, DL code utilization, UL Interference and the percentage of not served Radio Access Bearer requests.

When a single MOON carrier is considered loaded the RNC checks for the availability (3) of a second 5 MHz 3G carrier. Then, if no additional carrier is already available, a spectrum pre-emption mechanism is enabled (4) in the RNC to create space for an additional carrier, and then a second carrier is created (5) for traffic allocation of at least one of the operators. Preferably the RNC first activates pooled configuration, MOON, on both carriers (6).

Once the MOON is active with both pooled carriers, the RNC can choose to utilize the two carriers in any of the following ways, according to the operators' preferences established by their RAN-sharing agreement.

If the traffic from each operator, i.e., of each PLMN-Id, does not need more than one carrier (7), the RNC switches from the MOON configuration with two pooled carriers to a RAN Sharing dedicated configuration with two dedicated carriers (8).

If the traffic from one of the operators exceeds the usage of one carrier (9), the RNC can perform a reconfiguration, based on each operator's parameters of the RAN-sharing agreement, amongst any of the following three options:

Option 1: Switch one of the two carriers to dedicated configuration, RS-DC, and use MOON over the other carrier (10).

Option 2: Pre-emption of some traffic (11) of the Packet Switching domain, by using QoS-based pre-emption schemes implemented in the RNC, in order to go to the RS-DC configuration with two dedicated carriers (8).

Option 3: Maintain the two carriers in pooled configuration (12) for a determined time interval, using a timer, "Try-again Timer", for example, from 15 minutes to 8 hours with a 30 minutes step. When said timer expires (13), the RNC retries either option 1 or 2.

A possible application scenario is in UMTS 900 MHz Spectrum, which is mainly used by circuit switching—speech—services and UMTS technology can be activated in order to increase the capacity for speech or also for packet switching services. In this scenario, the method illustrated in FIG. 1 and in FIG. 2 too, uses the 900 MHz spectrum of both operators to create the initial UMTS Carrier (1, 21), which is used in the MOON or pooled configuration.

Figure 2:
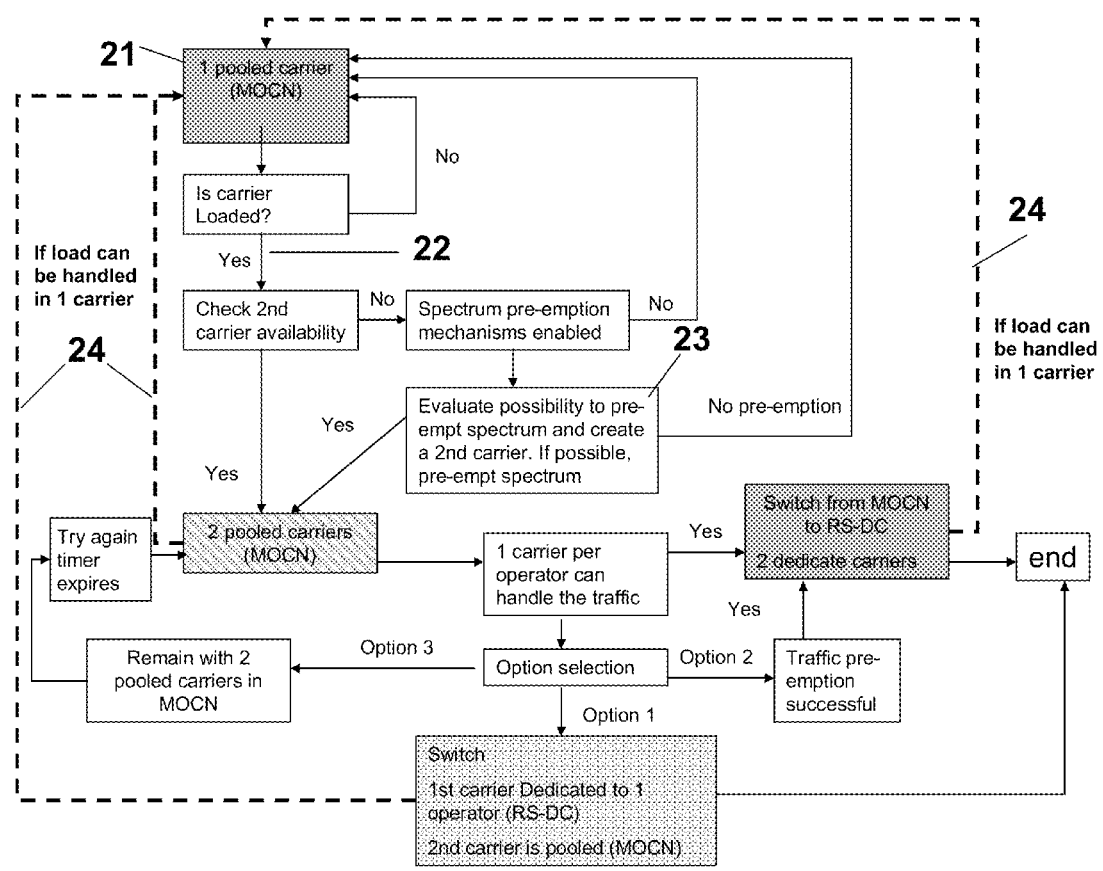
FIG. 2.—It shows a block diagram of the method for switching between network configurations in a shared radio access network which can support two carriers for in accordance to a further possible embodiment of the invention where it is included also the switching between 2 carriers and 1 carrier compared with the FIG. 1.

Going on FIG. 2, although these steps are the same as the ones shown in FIG. 1, and the UMTS900 application, if one carrier is loaded (22) and many circuit switching speech calls are rejected in UMTS or redirected to 2G due to the load, this indicates that a sufficient amount of terminals could be handled by a second carrier. In this case, the RNC tries to pre-empt (23) enough 2G spectrum, by using e.g. lower codec reconfiguration in 2G, in order to activate a second MOON carrier. If this pre-emption is successful, the RNC then makes the decision depending upon each operator's parameters to switch or not from the two MOON to a RS-DC mode in one or both carriers.

In addition, FIG. 2 shows how the method can return to a pooled single carrier. From any of the three proposed options using two carriers, in pooled, dedicated or mixed configuration combining pooled with dedicated carriers), the switching to MOON with a single UMTS carrier can be performed by the RNC when the measured load of all the carriers can be allocated to just one carrier (24).

The described method also applies to move back from a starting RS-DC case to a MOON mode.

The terms in which this specification has been worded are always to be taken in the broadest sense and not restrictively.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for switching between network configurations in a radio access network shared by a plurality of mobile network operators, wherein a radio spectrum is allocated to the mobile network operators and wherein two network configurations for sharing the radio access network are defined, a pooled configuration in which two or more of the mobile network operators share at least one carrier, and a dedicated configuration in which two or more of the mobile network operators utilize separate dedicated carriers the method comprising:
    allocating a single carrier to traffic of two or more of the plurality of mobile network operators, the two or more mobile network operators sharing the single carrier in the pooled configuration using a portion of the radio spectrum for allocating traffic of the two or more mobile network operators;
    measuring an indicator of traffic load in the shared single carrier;
    comparing the measured traffic load of the shared single carrier with a threshold value and when the measured traffic load exceeds the threshold value:
        checking availability of pre-empting the portion of the radio spectrum to divide the portion among a plurality of carriers and when said pre-emption is available,
        switching the two or more mobile network operators from the pooled configuration to the dedicated configuration in which each of the two or more mobile network operators is assigned to at least one of the plurality of carriers, the portion of the radio spectrum for allocating traffic of the mobile network operators being divided among the plurality of carriers such that the two or more mobile network operators no longer share the single carrier in the pooled configuration.

2. The method according to claim 1, wherein the plurality of carriers is shared by all the mobile network operators in the pooled configuration.

3. The method according to claim 1, wherein at least one carrier, from the plurality of carriers, is shared by all the mobile network operators in the pooled configuration and at least another carrier from the plurality of carriers is assigned to one respective mobile network operator, from the plurality of mobile network operators, in the dedicated configuration.

4. The method according to claim 1, wherein every carrier, from the plurality of carriers, is assigned to a respective mobile network operator in the dedicated configuration.

5. The method according to claim 1, further comprising measuring an indicator of combined traffic load in the plurality of carriers when in the dedicated configuration.

6. The method according to claim 5, further comprising switching back to the pooled configuration after switching to the dedicated configuration when the measured combined traffic load in the plurality of carriers can be allocated to the single carrier.

7. The method according to claim 1, wherein the pooled configuration conforms to the standardized Multiple Operator Core Network (MOCN).

8. The method according to claim 1, wherein the radio spectrum is the UMTS 900 MHz spectrum.

9. A radio network controller comprising processing means configured to implement the method for switching between network configurations in a radio access network recited in claim 1.

10. A non-transitory computer-readable medium which stores program code which, when executed by processing means of a radio network controller, causes said radio network controller to perform the method recited in claim 1.

11. The method according to claim 1, wherein the single carrier is one of the plurality of carriers.

12. A method for switching between network configurations in a radio access network shared by first and second mobile network operators, the method comprising:
    allocating a first carrier to handle traffic of the first and second mobile network operators in the radio access network, the first and second mobile network operators sharing the first carrier in a pooled configuration, the first carrier using a portion of a radio spectrum in the pooled configuration;
    measuring an indicator of traffic load in the first carrier while the first carrier is shared by the first and second mobile network operators in the pooled configuration and when the measured traffic load of the first carrier exceeds a threshold value:
        determining the availability of pre-empting the portion of the radio spectrum, and when the pre-emption is determined to be available:
            pre-empting the portion of the radio spectrum;
            creating a second carrier in the radio access network; and
            allocating the second carrier to handle traffic of the second mobile network operator in the radio access network so that the first and second carriers respectively handle traffic of the first and second mobile network operators in a dedicated configuration and the first and second mobile network operators no longer share the first carrier in the pooled configuration, the portion of the radio spectrum being divided between the first and second carriers in the dedicated configuration.

13. A method for switching between network configurations in a radio access network shared by first, second, and third mobile network operators, the method comprising:
    allocating a first carrier to handle traffic of the first, second, and third mobile network operators in the radio access network, the first, second, and third mobile network operators sharing the first carrier in a pooled configuration, the first carrier using a portion of a radio spectrum when handling the first, second, and third mobile network operators in the pooled configuration;
measuring an indicator of traffic load in the first carrier while the first carrier is shared by the first, second, and third mobile network operators in the pooled configuration and when the measured traffic load of the first carrier exceeds a threshold value:
   determining the availability of pre-empting the portion of the radio spectrum, and when the pre-emption is determined to be available:
      pre-empting the portion of the radio spectrum;
      creating a second carrier in the radio access network; and
      allocating the second carrier to handle traffic of the third mobile network operator in the radio access network so that the second carrier handles traffic of the third mobile network operator in a dedicated configuration and the first carrier continues to handle traffic of the first and second mobile network operators in a pooled configuration, such that the third mobile network operator no longer shares the first carrier with the first and second mobile network operators in the pooled configuration, the portion of the radio spectrum being divided between the first and second carriers when the second carrier is allocated in the dedicated configuration.

* * * * *

UNITED STATES PATENT AND TRADEMARK OFFICE
CERTIFICATE OF CORRECTION

PATENT NO. : 8,254,950 B2  
APPLICATION NO. : 12/701459  
DATED : August 28, 2012  
INVENTOR(S) : De Pasquale et al.

Page 1 of 1

It is certified that error appears in the above-identified patent and that said Letters Patent is hereby corrected as shown below:

On the Title Page Left-hand Column, Item (73)
Change name of Assignee from "Vodaphone Group PLC" to --Vodafone Group PLC--

Signed and Sealed this
Twenty-fifth Day of February, 2014

Michelle K. Lee
*Deputy Director of the United States Patent and Trademark Office*